United States Patent
Shokonji

(10) Patent No.: US 10,710,584 B2
(45) Date of Patent: Jul. 14, 2020

(54) FOLLOW-UP START CONTROL DEVICE FOR VEHICLE

(71) Applicant: SUBARU CORPORATION, Tokyo (JP)

(72) Inventor: Takafumi Shokonji, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 291 days.

(21) Appl. No.: 15/873,718

(22) Filed: Jan. 17, 2018

(65) Prior Publication Data

US 2018/0222480 A1    Aug. 9, 2018

(30) Foreign Application Priority Data

Feb. 8, 2017 (JP) ................................ 2017-021113

(51) Int. Cl.
| | |
|---|---|
| *B60W 30/16* | (2020.01) |
| *B60W 50/14* | (2020.01) |
| *B60K 31/00* | (2006.01) |
| *B60W 30/17* | (2020.01) |
| *B60W 40/04* | (2006.01) |

(52) U.S. Cl.
CPC ......... *B60W 30/16* (2013.01); *B60K 31/0008* (2013.01); *B60W 30/17* (2013.01); *B60W 40/04* (2013.01); *B60W 50/14* (2013.01); *B60W 2552/05* (2020.02); *B60W 2554/00* (2020.02); *B60W 2554/801* (2020.02)

(58) Field of Classification Search
None
See application file for complete search history.

(56) References Cited

U.S. PATENT DOCUMENTS

| 10,371,811 B2 * | 8/2019 | Shokonji ............... G01S 17/931 |
| 2018/0137762 A1 * | 5/2018 | Lee ..................... F02N 11/0814 |

FOREIGN PATENT DOCUMENTS

| JP | 2003-072410 A | 3/2003 |
| JP | 2008-540242 A | 11/2008 |
| JP | 2013-203380 A | 10/2013 |
| JP | 2015-074411 A | 4/2015 |

OTHER PUBLICATIONS

Japanese Office Action issued in corresponding Japanese Patent Application No. 2017-021113, dated Jul. 17, 2018, with English Translation.

* cited by examiner

*Primary Examiner* — Lail A Kleinman
(74) *Attorney, Agent, or Firm* — McDermott Will & Emery LLP

(57) ABSTRACT

A follow-up start control device for a vehicle includes a recognition unit, a first determination unit, a second determination unit, a controller, an estimation unit, and a setting unit. The recognition unit is configured to detect a stop and a start of a preceding vehicle. The first determination unit is configured to determine presence or absence of a traffic jam on a road. The second determination unit is configured to compare stop time with permission time. The controller is configured to execute a follow-up automatic start control when the second determination unit determines that the stop time is equal to or shorter than the permission time. The estimation unit is configured to estimate a category of the road, when the first determination unit determines the presence of the traffic jam. The setting unit is configured to set the permission time, in accordance with the category of the road.

14 Claims, 12 Drawing Sheets

| | | | [Km/h] |
|---|---|---|---|
| Sav | ≤ 15 | ≤ 30 | > 30 |
| P1 | 2 | 1 | 0 |

FIG. 12A

| | | | [deg] |
|---|---|---|---|
| θ stav | ≤ 30 | ≤ 60 | > 60 |
| P2 | 2 | 1 | 0 |

FIG. 12B

| | | [m/s²] |
|---|---|---|
| |FRONT−REAR Gmx| | ≤ 0.2 | > 0.2 |
| P3 | 1 | 0 |

FIG. 12C

| | | | [sec] |
|---|---|---|---|
| Tsrav | ≤ 90 | ≤ 120 | > 120 |
| P4 | 2 | 1 | 0 |

FIG. 12D

| | | | [sec] |
|---|---|---|---|
| Tsav | ≤ 30 | ≤ 60 | > 60 |
| P5 | 2 | 1 | 0 |

FIG. 12E

FOLLOW-UP START CONTROL DEVICE FOR VEHICLE

CROSS-REFERENCE TO RELATED APPLICATIONS

The present application claims priority from Japanese Patent Application No. 2017-021113 filed on Feb. 8, 2017, the entire contents of which are hereby incorporated by reference.

BACKGROUND

The technology relates to a follow-up start control device for a vehicle that causes an automatic start of an own vehicle following a start of a preceding vehicle.

An adaptive cruise control (ACC) system with an automatic maintaining control of an inter-vehicle distance has been previously known. The ACC system performs a constant-speed traveling control that includes maintaining a set vehicle speed in a case with no preceding vehicle. The ACC system performs a follow-up traveling control that includes, in a case with a preceding vehicle being detected, allowing the own vehicle to follow the preceding vehicle while maintaining a follow-up inter-vehicle distance.

Moreover, recently, also known is a system in which an application range of the ACC system is extended to a low-speed range of 0 [km/h] or more, to impart a function of traffic jam assistance (TJA) to the system. The TJA function is an automatic follow-up function in the traffic jam. In the ACC system with the TJA function, upon detecting a stop of a preceding vehicle as a follow-up target, the ACC system causes a start-up of a follow-up start control. The follow-up start control includes causing an automatic stop of an own vehicle following the stop of the preceding vehicle, detecting a start of the preceding vehicle, and thereafter, causing an automatic start of the own vehicle following the start of the preceding vehicle.

When the own vehicle gets caught in a traffic jam and remain stopped for a long time, there is higher possibility that a pedestrian, a bicycle, or other moving bodies come around frontward of the own vehicle. The ACC control therefore includes clocking elapsed time from the follow-up stop of the own vehicle to the start of the preceding vehicle, and cancelling the follow-up automatic start control in a case where the elapsed time is longer than pre-set follow-up start permission time. The ACC control further includes keeping the own vehicle stopped until the driver exhibits an intention of re-starting, e.g., until the driver steps down an accelerator pedal, or until the driver turns on an automatic operation switch again.

Regarding such a case, for example, Japanese Unexamined Patent Application Publication (JP-A) No. 2013-203380 discloses a technique of determining a start of a traffic jam in a case where a control unit detects turning-ON of hazard lights, and extending pre-set normal follow-up start permission time by set time. This saves the driver performing a complicated start operation repetitively in a traffic jam, leading to reduction in a load involved in the start operation.

SUMMARY

In general, as to the follow-up start control device for the vehicle as mentioned above, pursued is enhancement in user-friendliness and versatility. It is desirable to provide a follow-up start control device for a vehicle that makes it possible to enhance user-friendliness and versatility.

An aspect of the technology provides a follow-up start control device for a vehicle. The follow-up start control device includes a recognition unit, a first determination unit, a second determination unit, a controller, an estimation unit, and a setting unit. The recognition unit is configured to detect a stop and a start of a preceding vehicle that travels immediately in front of an own vehicle. The first determination unit is configured to determine presence or absence of a traffic jam on a road on which the own vehicle is currently traveling, on the basis of the stop and the start of the preceding vehicle and on the basis of parameters that indicate behavior of the own vehicle. The second determination unit is configured to compare stop time with permission time. The stop time is time from a follow-up stop of the own vehicle after the preceding vehicle to detection of the start of the preceding vehicle. The controller is configured to execute a follow-up automatic start control on the condition that the second determination unit determines that the stop time is equal to or shorter than the permission time. The follow-up automatic start control includes allowing the own vehicle to make a follow-up start after the preceding vehicle. The estimation unit is configured to estimate a category of the road, on the basis of the parameters, on the condition that the first determination unit determines the presence of the traffic jam on the road. The setting unit is configured to set the permission time, in accordance with the category of the road estimated by the estimation unit.

BRIEF DESCRIPTION OF THE DRAWINGS

FIG. 12A is a conceptual diagram of a first recognition evaluation table, with an average vehicle speed serving as a parameter.

FIG. 12B is a conceptual diagram of a second recognition evaluation table, with an average steering angle serving as a parameter.

FIG. 12C is a conceptual diagram of a third recognition evaluation table, with an absolute value of maximum front-rear G serving as a parameter.

FIG. 12D is a conceptual diagram of a fourth recognition evaluation table, with average running time serving as a parameter.

FIG. 12E is a conceptual diagram of a fifth recognition evaluation table, with average stop time serving as a parameter.

DETAILED DESCRIPTION

In the following, some implementations of the technology are described with reference to the drawings.

[First Implementation]

Figure 1:
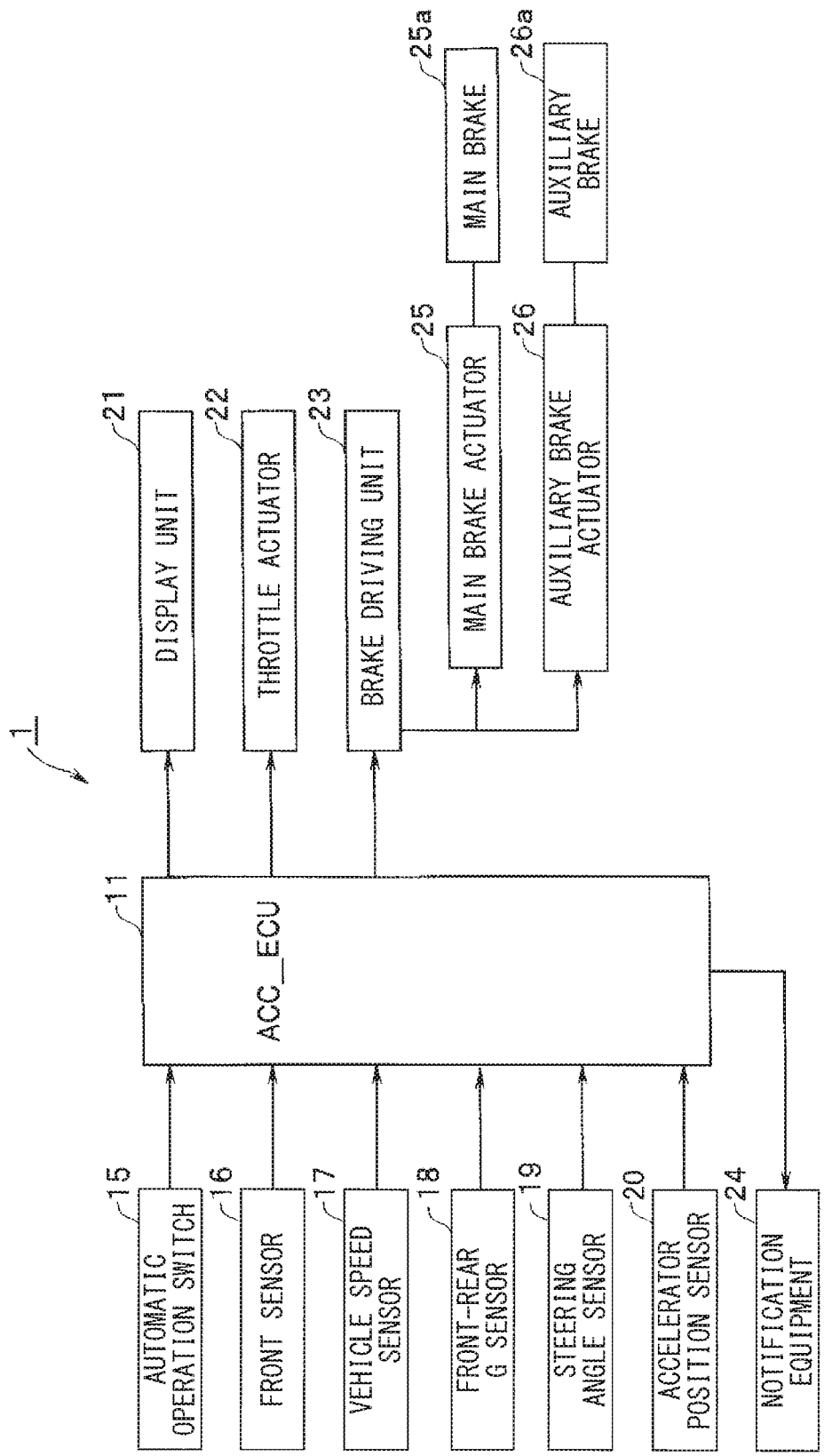
FIG. 1 is a block diagram of a configuration of a follow-up start control device according to a first implementation of the technology, in which the follow-up start control device is mounted on an own vehicle.
Figure 6:
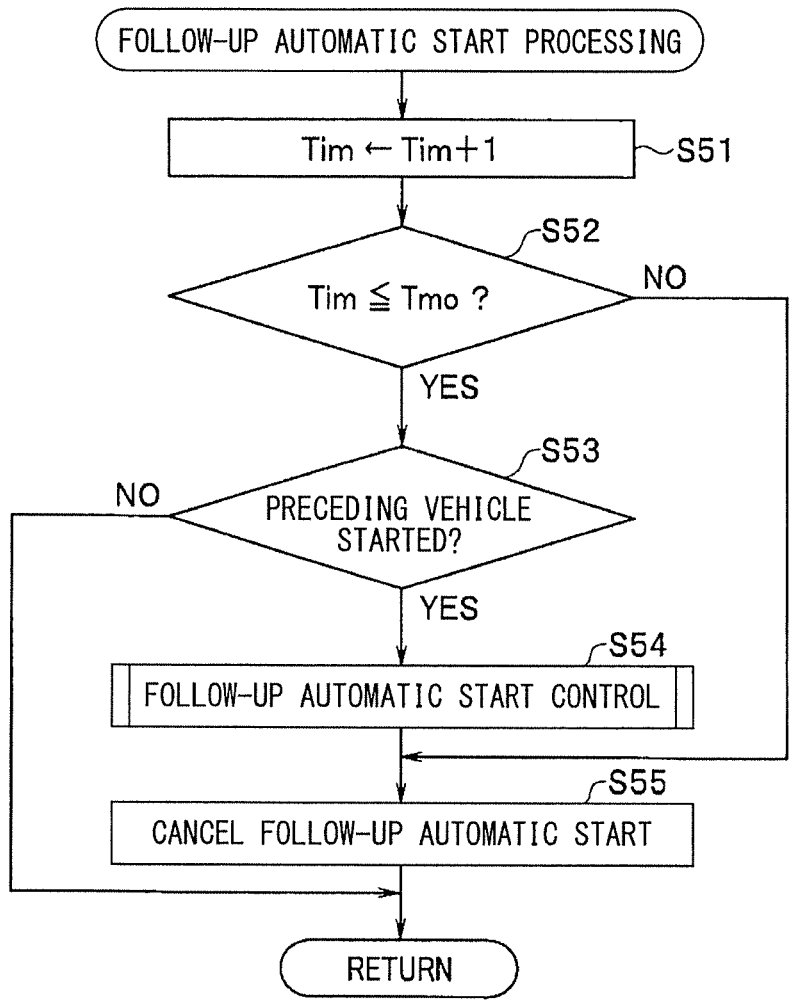
FIG. 6 is a flowchart of a routine of follow-up automatic start processing.
Figure 7:
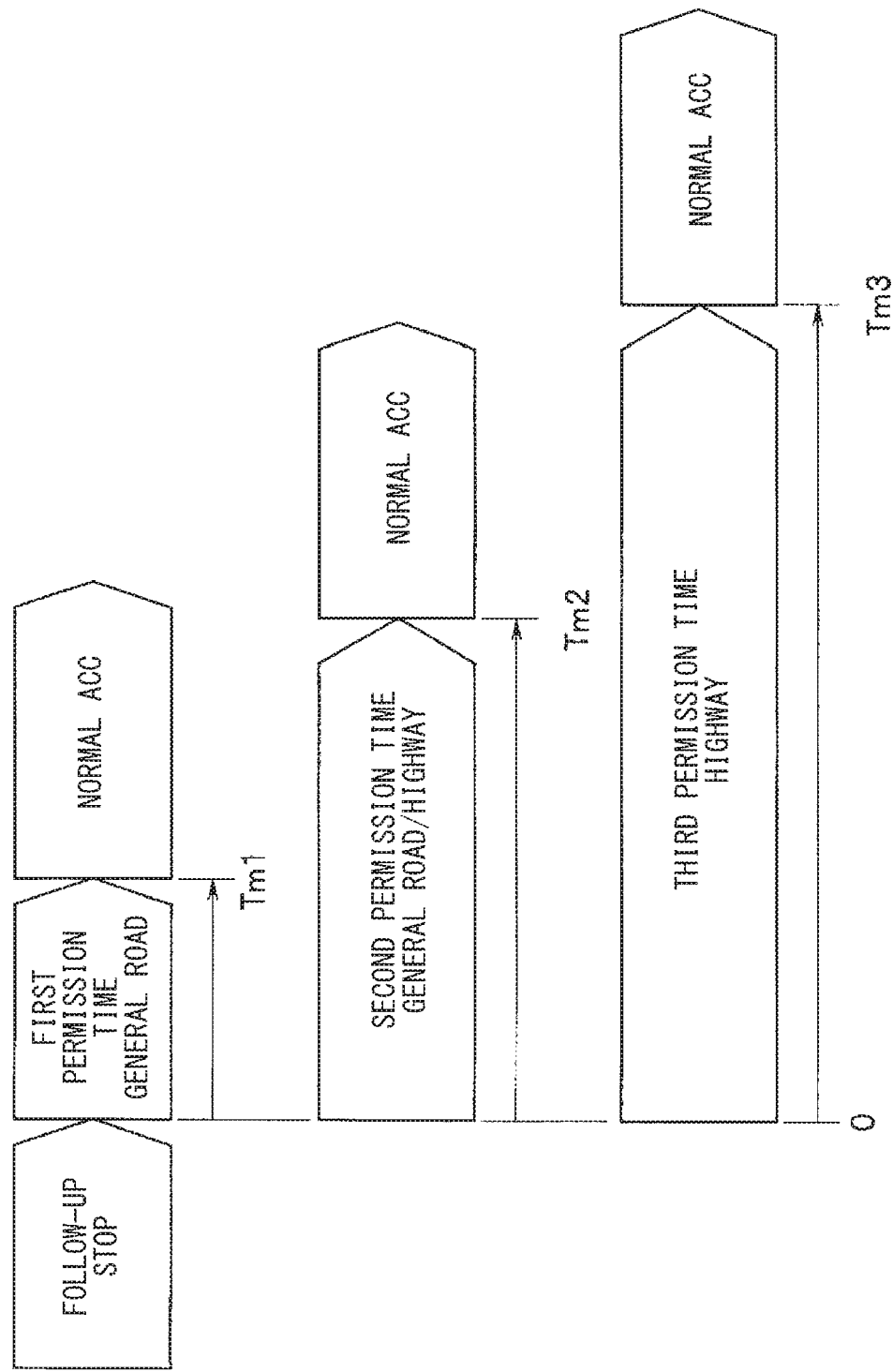
FIG. 7 is a conceptual diagram of follow-up start permission time set in accordance with road categories.
Figure 8:
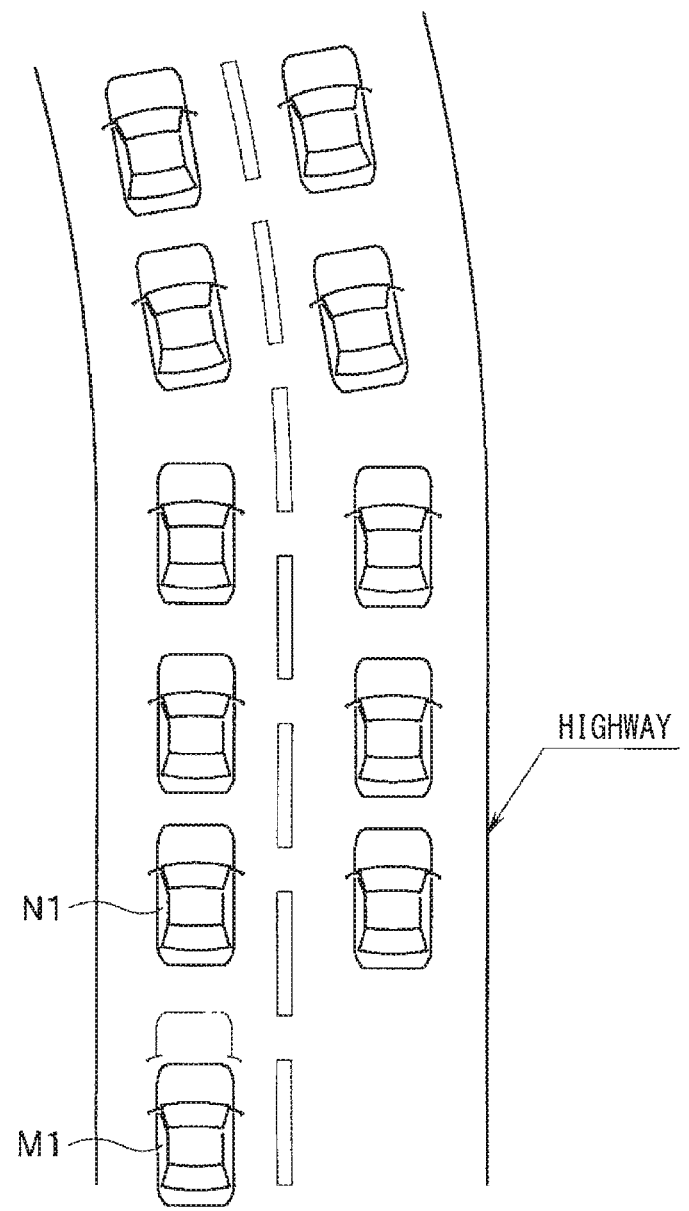
FIG. 8 is a bird's eye view of a traffic jam on a highway.
Figure 9:
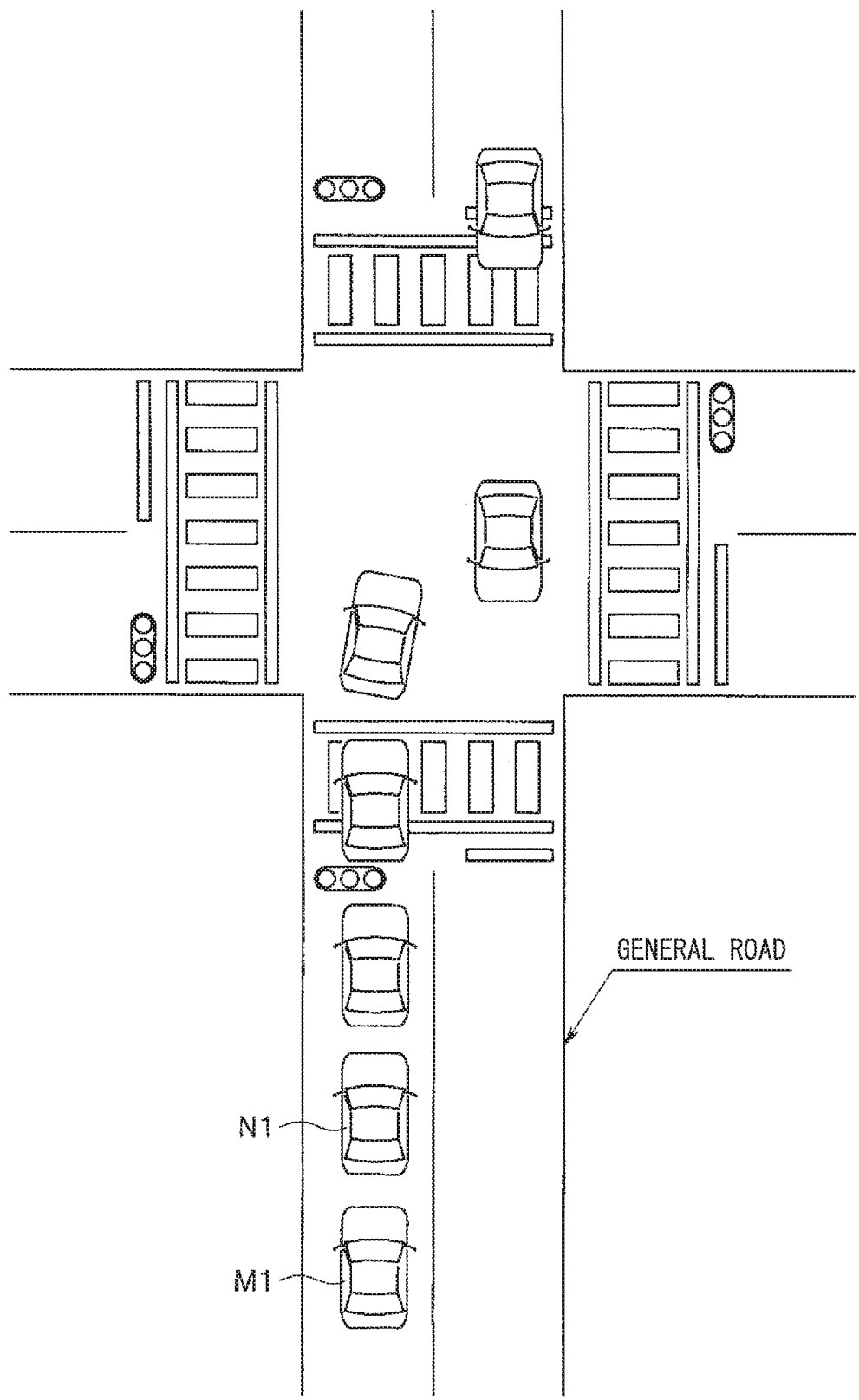
FIG. 9 is a bird's eye view of a traffic jam on a general road.

FIGS. 1 to 9 illustrate a first implementation of the technology. Referring to FIG. 1, a follow-up start control device 1 may be mounted on an own vehicle M as illustrated in FIGS. 8 and 9. The follow-up start control device 1 includes an ACC control unit (ACC_ECU) 11. In one implementation of the technology, the ACC_ECU 11 may serve as a "controller". The ACC_ECU 11 may include, as its main component, a known microcomputer including, for example, a central processing unit (CPU), a read only memory (ROM), and a random access memory (RAM). The ROM may store fixed data such as control programs and various tables. The control programs cause the CPU to perform pre-set operation.

To input side of the ACC_ECU 11, coupled may be an automatic operation switch 15, a front sensor 16, a vehicle speed sensor 17, a front-rear acceleration (G) sensor 18, a steering angle sensor 19, and an accelerator position sensor 20. The front sensor 16 may be mounted on the own vehicle 1 and detect frontward environment to acquire frontward information. The vehicle speed sensor 17 may detect a vehicle speed S of the own vehicle M1. Hereinafter, the vehicle speed S of the own vehicle M1 is also called an own-vehicle speed S. The front-rear G sensor 18 may detect front-rear G [m/s$^2$] generated in a vehicle body. The steering angle sensor 19 may detect a steering angle θst [deg] of a steering wheel. The accelerator position sensor 20 may detect an accelerator position θac on the basis of an amount of stepping down of an accelerator pedal by a driver. Here, the automatic operation switch 15 may be a composite switch provided for selection of any one from normal operation and automatic operation, and for setting of, for example, a set vehicle speed in ACC operation. The automatic operation switch 15 may be turned OFF in the normal operation, and be turned ON in the automatic operation. The automatic operation switch 15 may be so positioned as to be operable by the driver, e.g., on an instrument panel or a steering wheel in front of a driver's seat.

The front sensor 16 may be a sensor that acquires information mainly on a preceding vehicle N1 as illustrated in FIGS. 8 and 9. The preceding vehicle N1 means a vehicle that travels immediately in front of the own vehicle M1. Non-limiting examples of the front sensor 16 may include an ultrasonic sensor, millimeter wave radar, microwave radar, an infrared sensor, and laser radar. The front sensor 16 may be attached to, for example, a front surface of a front bumper. It is to be noted that the front sensor 16 may be a stereo camera including a main camera and a sub camera. Alternatively, the front sensor 16 may include a combination of a monocular camera and a component such as the ultrasonic sensor, the millimeter wave radar, the microwave radar, the infrared sensor, and the laser radar as recited above.

To output side of the ACC_ECU 11, coupled may be a display unit 21, a throttle actuator 22, a brake driving unit 23, and notification equipment 24. The throttle actuator 22 may cause open and close operation of a throttle valve of an electronically controlled throttle. The notification equipment 24 may include, for example, a buzzer and/or a speaker. It is to be noted that the display unit 21 may be, for example, a multi-information display (MID) provided on a combination meter in front of the driver's seat.

To the brake driving unit 23, coupled may be a main brake actuator 25 and an auxiliary brake actuator 26. The main brake actuator 25 may increase or decrease hydraulic brake, to adjust braking power with respect to a main brake 25a. The hydraulic brake may be supplied from an undepicted hydraulic control unit (HCU). The main brake 25a may be, for example, a disk brake provided on each wheel. The auxiliary brake actuator 26 may operate an auxiliary brake 26a at the time of a stop, to maintain a stopped state of the own vehicle M1. The auxiliary brake 26a may be, for example, a drum brake provided in left and right rear wheels. It is to be noted that the main brake 25a may also be able to obtain desired braking power, by a foot brake operation made by the driver.

The ACC_ECU 11 may output, on the basis of signals from the various sensors and switches, a drive signal to the throttle actuator 22 of the electronically controlled throttle and to the brake driving unit 23. The ACC_ECU 11 may check, on the basis of traveling environment information detected by the front sensor 16, whether or not the preceding vehicle N1 that travels frontward of the own vehicle M1 has been captured. In a case where the preceding vehicle N1 has not been captured, the ACC_ECU 11 may execute a constant-speed traveling control or a constant-speed cruise control that includes allowing the own vehicle M1 to travel at the set vehicle speed. In a case where the preceding vehicle N1 has been captured, the ACC_ECU 11 may execute a follow-up traveling control or a follow-up cruise control that includes following the preceding vehicle N1 with a predetermined inter-vehicle distance.

Moreover, the ACC_ECU 11 may detect a stop and a start of the preceding vehicle N1 as a follow-up target captured by the front sensor 16. In one implementation of the technology, the ACC_ECU 11 may serve as a "recognition unit". Furthermore, a follow-up range after the preceding vehicle N1 may be extended to a low-speed range of 0 [km/h] or more. Accordingly, in a case where the ACC_ECU 11 detects the stop of the preceding vehicle N1, the ACC_ECU 11 may cause an automatic stop of the own vehicle M1 following the stop of the preceding vehicle N1. In a case where the ACC_ECU 11 detects the start of the preceding vehicle N1, with stop time being equal to or shorter than follow-up start permission time, the ACC_ECU 11 may cause an automatic start of the own vehicle M1. The follow-up start permission time may be variably set in accordance with road categories. In this implementation, the road categories may include a "general road", and a "highway" that typifies an expressway.

In one more specific but non-limiting example, upon recognizing the stop of the preceding vehicle N1 on the basis of the traveling environment information detected by the front sensor 16, the ACC_ECU 11 may cause the stop, i.e., a follow-up stop, of the own vehicle M2, with a pre-set stop inter-vehicle distance being maintained. The ACC_ECU 11 may clock the stop time Ts of the own vehicle M1. The stop time Ts means time from the follow-up stop of the own vehicle M1 to detection of the start of the preceding vehicle N1.

In a case where the stop time Ts is equal to or shorter than the follow-up start permission time, the ACC_ECU 11 may cause the automatic start of the own vehicle M1 after the preceding vehicle N1 is away by a pre-set start inter-vehicle distance. This may be referred to as a "follow-up start control". In a case where the stop time Ts is longer than the follow-up start permission time, the ACC_ECU 11 may cancel the follow-up start control, and cause a transition to a normal ACC control. Accordingly, in trying to cause the start of the own vehicle M1 in this state, the driver may step down the accelerator pedal, or make an operation such as turning ON of the automatic operation switch 15 again, to give a start command to the ACC_ECU 11.

In a case where the ACC_ECU 11 determines a traffic jam on the basis of relation between the own vehicle M1 and the preceding vehicle N1, the ACC_ECU 11 may identify a category of the currently-traveled road. The road may be categorized in any one of categories including, for example, the general road, a road that is undeterminable as to whether the road is the highway or whether the road is the general road, and the highway. As illustrated in FIG. 7, in this implementation, set may be first permission time Tm1, second permission time Tm2, and third permission time Tm3, in accordance with the road categories to be identified, with relation: Tm1<Tm2<Tm3. Incidentally, in this implementation, the first permission time Tm1 may be set at about 3 [sec] (Tm1=3 [sec]). The second permission time Tm2 may be set at about 5 [sec] to 15 [sec] both inclusive (Tm2=5 to 15 [sec]). The third permission time Tm3 may be set at about 20 [sec] to 35 [sec] both inclusive (Tm3=20 to 35 [sec]). However, this is non-limiting. It is to be noted that more detailed classification of road environment may be made, to set fourth permission time or permission time of higher orders. Alternatively, solely the first and the second permission time may be set, with the third permission time omitted.

The ACC_ECU 11 may execute traffic jam determination and road category identification. The traffic jam determination and the road category identification may be executed in a routine of the traffic jam determination as illustrated in FIG. 2.

Figure 2:
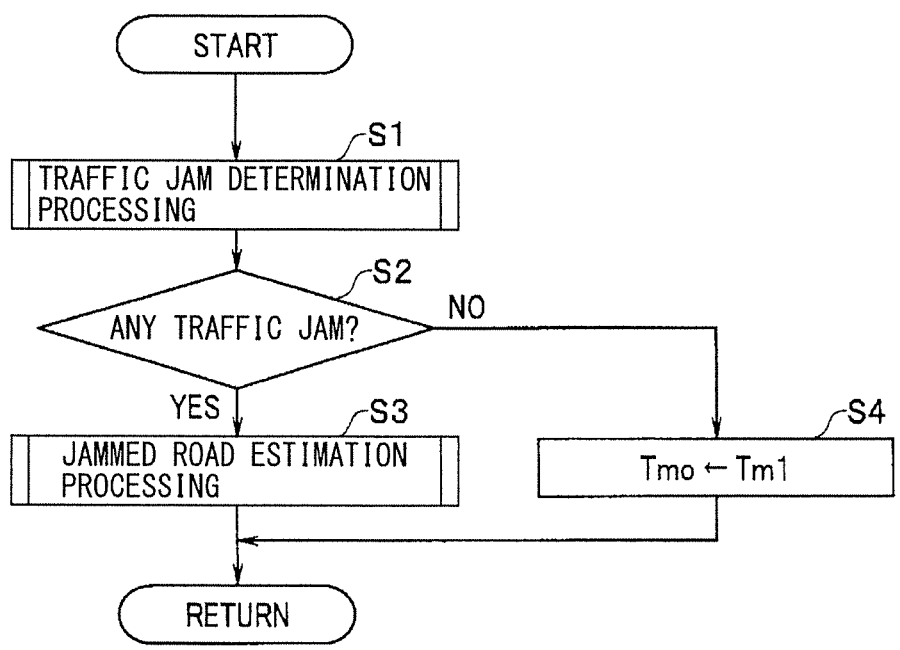
FIG. 2 is a flowchart of a routine of traffic jam determination processing.

Upon a start-up of the ACC_ECU 11, first, executed may be the routine of the traffic jam determination as illustrated in FIG. 2. In step S1, the traffic jam determination may be made. In one implementation of the technology, the ACC_ECU 11 that performs processing in step S1 may serve as a "first determination unit".

The traffic jam determination may be made on the basis of, for example, the vehicle speed S [km/h] of the own vehicle M1 on follow-up travel after the preceding vehicle N1. In other words, a determination may be made as to presence of the traffic jam, in a case where the ACC_ECU 11 detects a state in which the vehicle speed S of the own vehicle M1 on the follow-up travel intermittently falls to or below a stop determination vehicle speed, e.g., 15 [km/h], or in a case where the ACC_ECU 11 detects a state in which the own vehicle M1 intermittently repeats stops and starts in predetermined time. Alternatively, the presence of the traffic jam may be determined, on the basis of the own-vehicle speed S and brake switch operations, in a case where a brake switch is repetitively turned ON and OFF the predetermined number of times or more, in predetermined time, on low-speed travel.

Thereafter, the flow may proceed to step S2. In step S2, a determination may be made as to the presence or absence of the traffic jam. In a case with the determination as to the presence of the traffic jam, the flow may proceed to step S3. In a case with the determination as to the absence of the traffic jam, the flow may branch to step S4. In step S3, jammed road estimation processing may be executed, and the routine may be terminated. In step S4, the follow-up start permission time Tmo may be updated to the first permission time Tm1 described later (Tmo←Tm1), and the routine may be terminated.

Figure 3:
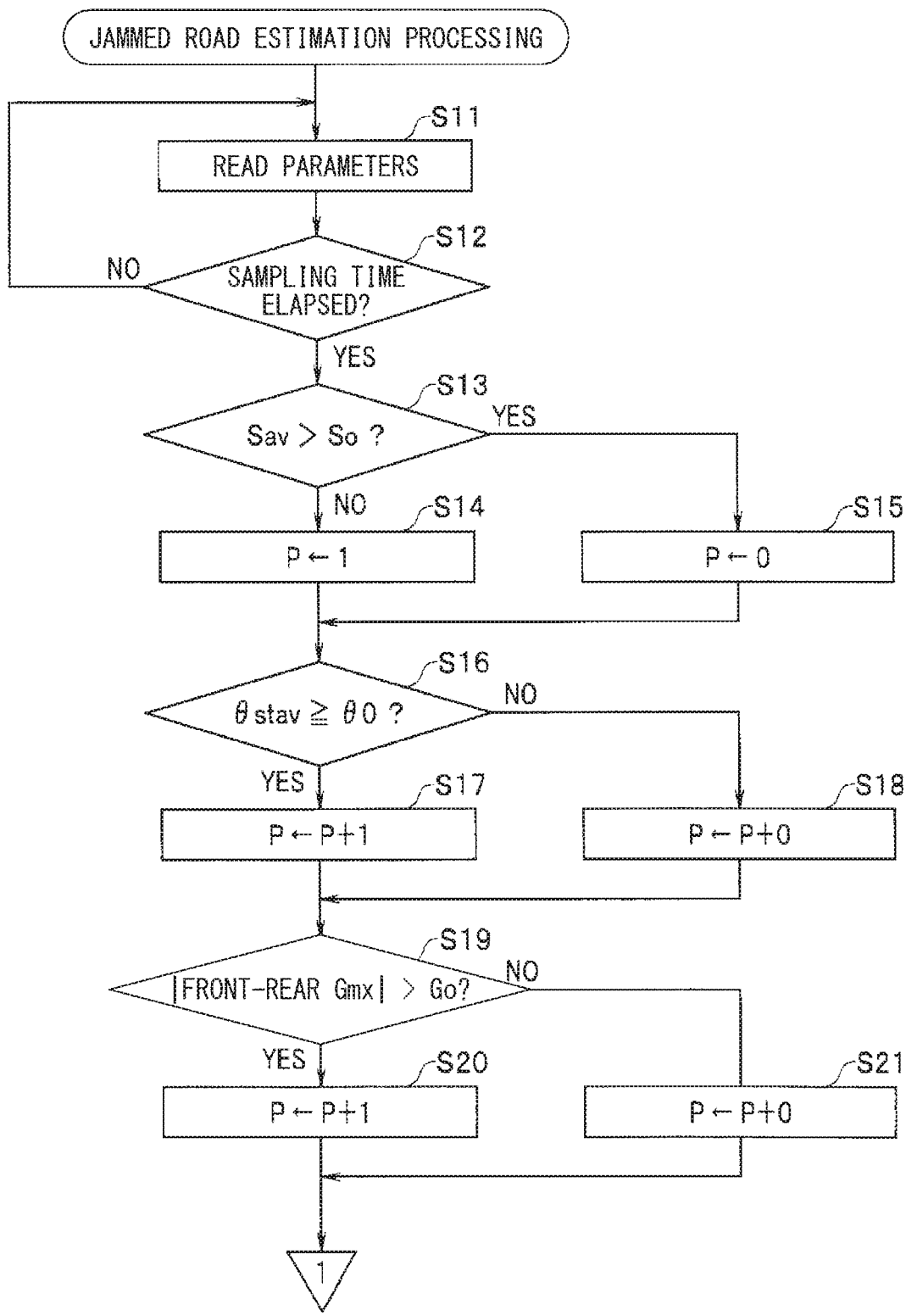
FIG. 3 is a flowchart (part 1) of a sub-routine of jammed road estimation processing.
Figure 4:
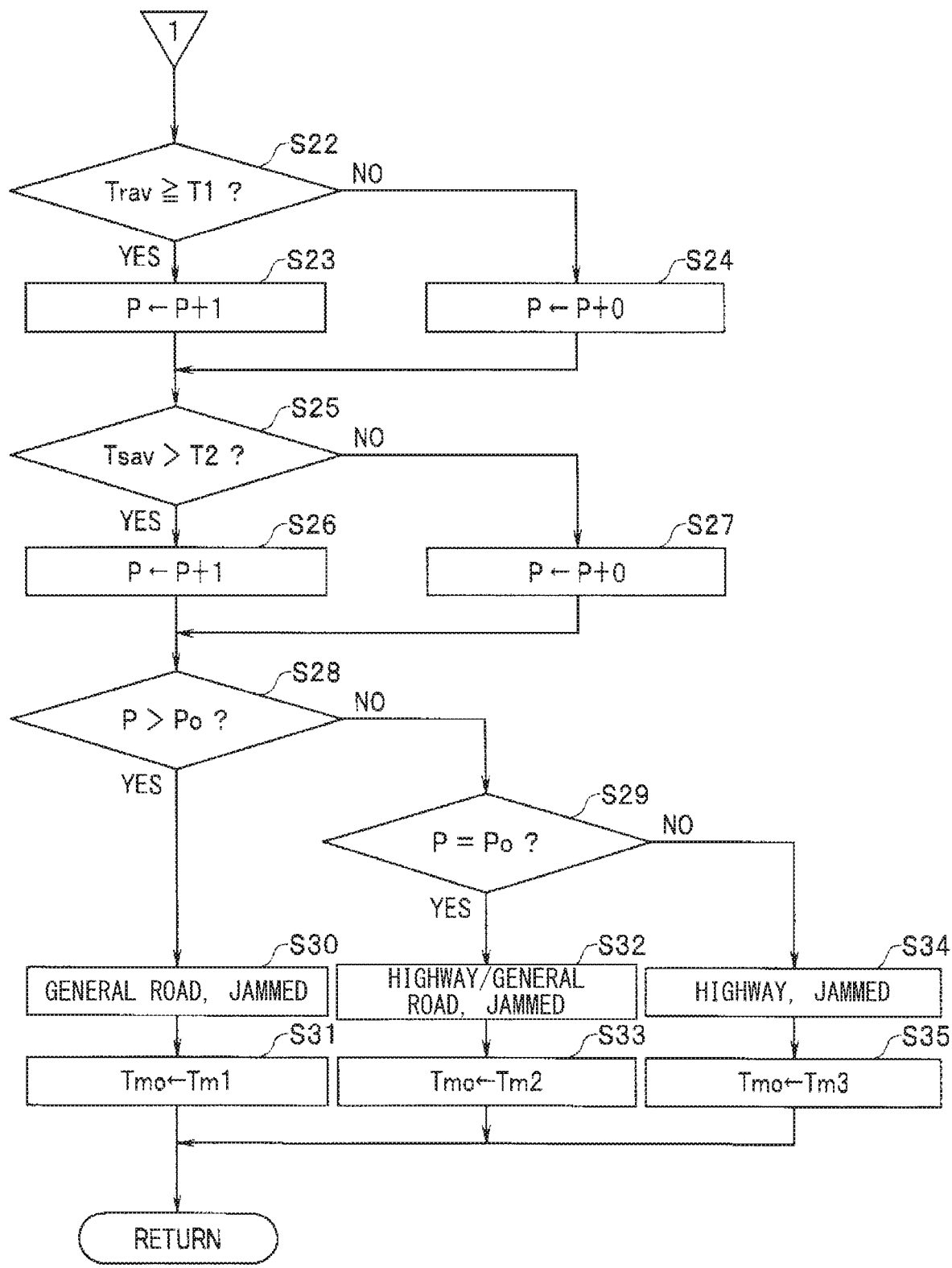
FIG. 4 is a flowchart (part 2) of the sub-routine of the jammed road estimation processing.

The jammed road estimation processing executed in step S3 as mentioned above may be processed in accordance with a sub-routine of the jammed road estimation processing as illustrated in FIGS. 3 and 4. In one implementation of the technology, the ACC_ECU 11 that performs steps S11 to S30, S32, and S33 described later may serve as an "estimation unit".

In this sub-routine, first, in step S11, parameters may be read. The parameters may be involved in determining the category of the currently-jammed road, i.e., the "general road" or the "highway". In this implementation, information indicating behavior of the own vehicle may serve as the parameters. In one specific but non-limiting example, the parameters may be based on the own-vehicle speed S, the steering angle θst, the front-rear G, the stop time Tst1 of the own vehicle M1, and the running time Tst2 of the own vehicle M1. The own-vehicle speed S may be detected by the vehicle speed sensor 17. The steering angle θst may be detected by the steering angle sensor 19. The front-rear G may be detected by the front-rear G sensor 18. The running time Tst2 may be time from the start of the own vehicle M1 to the stop of the own vehicle M1.

Thereafter, the flow may proceed to step S12. In step S12, each of the parameters may be sequentially sampled until pre-set sampling time elapses. The sampling time may be, for example, about 1 [min] to 2 [min] both inclusive. Upon the elapse of the sampling time, the flow may proceed to step S13. In steps S13 to S27, an estimation may be made as to whether the currently-traveled road is the general road or whether the currently-traveled road is the highway, as follows. First, a comparison of an average value or a maximum value of each of the parameters sampled in the sampling time with a pre-set threshold may be made. Thereafter, an estimation may be made, for each of the parameters, as to whether the currently-traveled road is the general road or whether the currently-traveled road is the highway. In a case where the currently-traveled road is estimated to be the general road, a road recognition evaluation value P may be incremented (P←P+1). In a case where the currently-traveled road is estimated to be the highway, the road recognition evaluation value P may be maintained (P←P+0).

Thereafter, in steps S28 to S32, on the basis of the road recognition evaluation value P thus calculated, a final determination may be made as to whether the currently-traveled road is the general road or whether the currently-traveled road is the highway. Thus, the follow-up start permission time Tmo may be set in accordance with the road category. In one implementation of the technology, the ACC_ECU 11 that performs steps S28 to S32 may serve as a "setting unit".

First, in step S13, obtained may be an average vehicle speed Sav [km/h]. The average vehicle speed Sav is an average value in the sampling time of the vehicle speed S measured during travel. A comparison of the average vehicle speed Sav with a pre-set road category determination vehicle speed So may be made. In general, a queue of vehicles in the traffic jam is longer on the highway as illustrated in FIG. 8, than on the general road. Accordingly, a maximum vehicle speed on the highway is lower than that on the general road, and there is a tendency to crawl on the highway. The maximum vehicle speed on the highway is as low as about 20 [km/h] to 30 [km/h] both inclusive, while the maximum vehicle speed on the general road is about 30 [km/h] to 60 [km/h] both inclusive.

The road category determination vehicle speed So may be obtained, by focusing on a change in the vehicle speed in the traffic jam as mentioned above, on the basis of previous statistics and/or simulation. In this implementation, the road category determination vehicle speed So may be set at about 20 [km/h] to 30 [km/h] both inclusive.

In a case of Sav>So, a determination may be made that the currently-traveled road is highly likely to be the general road, and the flow may proceed to step S14. In step S14, the road recognition evaluation value P may be set (P←1), and the flow may proceed to step S16. In a case of Sav≤So, a determination may be made that the currently-traveled road is highly likely to be the highway, and the flow may branch to step S15. In step S15, the road recognition evaluation value P is cleared (P←0), and the flow may proceed to step S16.

In step S16, a comparison of an average steering angle θstav [deg] with a road category determination steering angle θo may be made. The average steering angle θstav is an average value in the sampling time of the steering angle θst detected by the steering angle sensor 19. In a case with a linear road, the steering angles θst calculated for the general road and the highway exhibit the substantially same value. However, in the highway, in making a transition from a linear road to a curved road, the linear road and the curved road are smoothly coupled by a clothoid curve. The steering angle θst of the highway is, therefore, smaller than the steering angle θst of the general road. Furthermore, as illustrated in FIG. 8, a radius of curvature of the curved road of the highway is larger than that of the general road. That is, the curved road of the highway is of mildly-curved design. Accordingly, there is high possibility that the average steering angle θstav, i.e., the average value of the steering angle θst sampled in the predetermined sampling time is higher in the general road. The road category determination steering angle θo may be obtained, by focusing on a difference in linear features between the general road and the highway as described above, on the basis of, for example, simulation.

In a case of θstav>θo, a determination may be made that the currently-traveled road is highly likely to be the general road, and the flow may proceed to step S17. In step S17, the road recognition evaluation value P may be incremented (P←P+1), and the flow may proceed to step S19. In a case of θstav≤θo, a determination may be made that the currently-traveled road is highly likely to be the highway, and the flow may branch to step S18. In step S18, the road recognition evaluation value P may be maintained (P←P+0), and the flow may proceed to step S19.

In step S19, a comparison of an absolute value |front-rear Gmx| [m/s²] with road category determination acceleration and deceleration Go may be made. The absolute value |front-rear Gmx| is an absolute value of a maximum value of the front-rear G, i.e., deceleration or acceleration, detected in the sampling time by the front-rear G sensor 18. As described, traveling on the jammed highway has the tendency to crawl, or to move with repetitive stops and starts at a low speed. In contrast, the traffic jam on the general road is often caused by, for example, blocking of a flow of the queue of the vehicle by a red light, i.e., a traffic jam caused by waiting for a traffic light, a waiting state of a leading vehicle entering an intersection of a road including one lane on each side as illustrated in FIG. 9, to cross an opposite lane, e.g., to turn right in a case of left-side traffic, or a temporary stop at a railroad crossing. In this case, when the traffic light turns to green, or when the vehicle waiting for the traffic light has crossed the opposite lane, the subsequent vehicles begin to move.

Repetitive stops and starts at predetermined time interval causes the front-rear G of the vehicle that travels on the general road to exhibit a larger value than that of the vehicle that crawls on the highway, i.e., moves with repetitive stops and starts in short time. The road category determination acceleration and deceleration Go may be set by focusing on a distinctive difference in vehicular traveling in the traffic jam. In this implementation, the road category determination acceleration and deceleration Go may be set at, for example, about 0.2 G (Go=0.2 G).

In a case of |front-rear Gmx|>Go, a determination may be made that the currently-traveled road is highly likely to be the general road, and the flow may proceed to step S20. In step S20, the road recognition evaluation value P may be incremented (P←P+1), and the flow may proceed to step S22. In a case of |front-rear Gmx|≤Go, a determination may be made that the currently-traveled road is highly likely to be the highway, and the flow may branch to step S21. In step S21, the road recognition evaluation value P may be maintained (P←P+0), and the flow may proceed to step S22.

In step S22, running time Tr may be clocked on the basis of the vehicle speed S detected in the sampling time by the vehicle speed sensor 17. The running time Tr is time between the stop (S=0) and the next stop (S=0), i.e., time from the start to the next stop. A comparison of average running time Trav [sec] with pre-set first road category determination time T1 may be made. The average running time Trav is an average of the running time Tr. In general, the running time Tr from the stop to the next stop in the traffic jam may be affected, on the general road, by waiting for a change in the traffic light, waiting because of a temporary stop, and waiting to cross the opposite lane, e.g., waiting to turn right in the left-side traffic. In contrast, on the highway, although there is no such waiting because of the temporary stop, the queue of the vehicles is long. The running time Tr on the highway, therefore, tends to be shorter than that on the general road. The first road category determination time T1 may be obtained, by focusing on such behavior of the own vehicle M1 in the traffic jam, on the basis of, for example, simulation.

In a case of Trav>T1, a determination may be made that the currently-traveled road is highly likely to be the general road, and the flow may proceed to step S23. In step S23, the road recognition evaluation value P may be incremented (P←P+1), and the flow may proceed to step S25. In a case of Trav≤T1, a determination may be made that the currently-traveled road is highly likely to be the highway, and the flow may branch to step S24. In step S24, the road recognition evaluation value P may be maintained (P←P+0), and the flow may proceed to step S25.

In step S25, the stop time Ts may be clocked, on the basis of the vehicle speed S detected in the sampling time. The stop time Ts is time between a run (S>0) and a next run (S>0). A comparison of average stop time Tsav [sec] with pre-set second road category determination time T2 may be made. The average stop time Tsav is average time of the stop time Ts. As described, the traffic jam on the general road may be mainly caused by waiting for the change in the traffic light, waiting because of the temporary stop, and waiting to cross the opposite lane, e.g., waiting to turn right in the left-side traffic. In contrast, the traffic jam on the highway may be caused by the long queue of the vehicles involved in the traffic jam. In the traffic jam on the highway, with the repetitive starts and stops in the short time, the stop time Ts tends to be shorter than that of the general road. The second road category determination time T2 may be obtained, by focusing on such behavior of the own vehicle M1 in the traffic jam, on the basis of, for example, simulation.

In a case of Tsav>T2, a determination may be made that the currently-traveled road is highly likely to be the general road, and the flow may proceed to step S26. In step S26, the road recognition evaluation value P may be incremented (P←P+1), to set the road recognition evaluation value P as a final scoring evaluation. Thus, the flow may proceed to step S28. In a case of Tsav≤T2, a determination may be made that the currently-traveled road is highly likely to be the highway, and the flow may branch to step S27. In step S27, the road recognition evaluation value P may be maintained (P←P+0), and the flow may proceed to step S28.

In steps S28 and S29, a comparison of the road recognition evaluation value P with the road category determination threshold Po may be made, to estimate whether the currently-traveled road is the general road or whether the currently-traveled road is the highway. In this case, if the road category determined in steps S13, S16, S19, S22, and S25 as mentioned above is conclusive, the road recognition evaluation value P on the general road becomes 5 (P=5), and the road recognition evaluation value P on the highway becomes 0 (P=0). However, the determination results in the respective steps are not conclusive, but naturally include erroneous determinations. Accordingly, the road recognition evaluation value P may be classified with respect to the road category determination threshold Po, to make a determination close to the actual road category. It is to be noted that the road category determination threshold Po may be obtained by, for example, simulation of the behavior of the own vehicle in the traffic jam.

First, in a case of P>Po, the flow may proceed to step S30. In step S30, a determination may be made that the jammed road is the general road. In step S31, the follow-up start permission time Tmo may be set at the first permission time Tm1 (Tmo←Tm1), and the routine may be terminated.

In a case of P=Po the flow may proceed to step S32. In step S32, a determination may be made that the jammed road is in an intermediate region that is undeterminable as to whether the road is the general road or whether the road is the highway. In step S33, the follow-up start permission time Tmo may be set at the second permission time Tm2 (Tmo←Tm2), and the routine may be terminated.

In a case of P≤Po, the flow may proceed to step S34. In step S34, a determination may be made that the jammed road is the highway. In step S35, the follow-up start permission time Tmo may be set at the third permission time Tm3 (Tmo←Tm3), and the routine may be terminated. The follow-up start permission time Tmo may be read in a routine of follow-up automatic start processing described later. In one implementation of the technology, the ACC_ECU 11 that performs steps S31, S33, and S35 may serve as a "setting unit".

Figure 5:
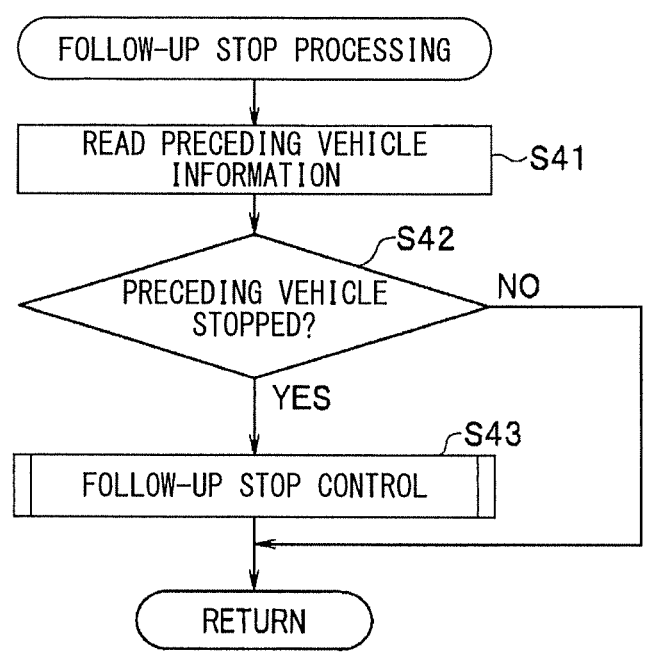
FIG. 5 is a flowchart of a routine of follow-up stop processing.

Simple description is given next of a follow-up stop control to be executed by the ACC_ECU 11, with reference to a routine of follow-up stop processing as illustrated in FIG. 5. In this routine, first, in step S41, preceding vehicle information may be read from the traveling environment information detected by the front sensor 16.

Thereafter, the flow may proceed to step S42. In step S42, a check may be made as to whether or not the preceding vehicle N1 has stopped, on the basis of the vehicle speed S of the own vehicle M1 and on the basis of the inter-vehicle distance from the preceding vehicle N1 to the own vehicle M1. In a case where the preceding vehicle N1 is running, the routine may be terminated. In a case where the stop of the preceding vehicle N1 is detected, the flow may proceed to step S43. In step S43, the follow-up stop control may be executed, and the routine may be terminated.

In the follow-up stop control, for example, a target vehicle speed, i.e., deceleration, may be obtained per each calculation cycle, on the basis of a target inter-vehicle distance at the time of the stop and on the basis of the actual inter-vehicle distance. The target vehicle speed, i.e., the deceleration, may be a vehicle speed or deceleration that causes the own vehicle M1 to stop with the pre-set target inter-vehicle distance at the time of the stop. Thereafter, a vehicle speed control may be made by outputting the drive signal to the throttle actuator 22 and to the brake driving unit 23, to bring the own-vehicle speed S to the target vehicle speed. This causes gradual deceleration, to cause a follow-up stop of the own vehicle M1. Thereafter, after the own vehicle M1 makes the follow-up stop as predetermined, the main brake actuator 25 may keep on supplying the hydraulic brake to the main brake 25a, to prepare for a follow-up automatic start.

Upon detecting the follow-up stop of the own vehicle M1, the ACC_ECU 11 may start the routine of the follow-up automatic start processing as illustrated in FIG. 6.

In this routine, first, in step S51, clocking of stop time Tim may be started (Tim←Tim+1). Thereafter, the flow may proceed to step S52. In step S52, a check may be made as to whether or not the stop time Tim has reached the follow-up start permission time Tmo set in accordance with the road category in the sub-routine of the jammed road estimation processing as described with reference to FIG. 3. In a case where the stop time Tim is equal to or shorter than the follow-up start permission time Tmo (Tim≤Tmo), the flow may proceed to step S53. In a case where the stop time Tim is longer than the follow-up start permission time Tmo (Tim>Tmo), the flow may jump to step S55. In step S55, a follow-up automatic start control may be cancelled, and the routine may be terminated. As a result, a transition may be made to the normal ACC control, as illustrated in FIG. 7. In one implementation of the technology, the ACC_ECU 11 that performs steps S51 and S52 may serve as a "second determination unit".

In step S53, a check may be made as to whether or not the preceding vehicle N1 has started, on the basis of the preceding vehicle information from the front sensor 16. In a case where the start of the preceding vehicle N1 is detected, the flow may proceed to step S54. In a case where the preceding vehicle N1 is kept stopped, the routine may be terminated.

Upon the detection of the start of the preceding vehicle N1, the flow may proceed to step S54. In step S54, the follow-up automatic start control may be executed, and the flow may proceed to step S55. The follow-up automatic start control may include, first, standing by until the inter-vehicle distance from the preceding vehicle N1 to the own vehicle M1 reaches a pre-set start inter-vehicle distance. The start inter-vehicle distance may be larger than the stop inter-vehicle distance (the stop inter-vehicle distance<the start inter-vehicle distance). Thereafter, upon the inter-vehicle distance reaching the start inter-vehicle distance, a signal of cancellation of maintaining the stop may be transmitted to the brake driving unit 23. Moreover, a predetermined throttle position signal may be transmitted to the throttle actuator 22. Thus, the main brake 25a may be released, while the throttle valve may be opened as predetermined, to cause the start after elapse of predetermined brake release time. It is to be noted that in causing the automatic start of the own vehicle M1, the notification equipment 24 may notify the driver of the start.

After the automatic start, upon the vehicle speed S reaching a predetermined vehicle speed, the follow-up automatic start control may be ended, and the flow may proceed to step S55. In step S55, the follow-up automatic start control may be cancelled, and the routine may be terminated. As a result, the transition may be made to the normal ACC control.

In this implementation, in the case with the determination as to the presence of the traffic jam, the category of the currently-traveled road is estimated on the basis of the parameters indicating the behavior of the own vehicle M1. In accordance with the road category estimated, the follow-up start permission time Tmo is set. This makes it possible to set the appropriate follow-up start permission time Tmo in accordance with the road category. Moreover, it is possible to determine the category of the jammed road, without using the car navigation system or the on-vehicle camera. Hence, it is possible to obtain a high level of versatility.

As described, in this implementation, the follow-up start permission time Tmo in the traffic jam is set in accordance with the road category. The follow-up start permission time Tmo on the highway may be set longer than that on the general road. This makes it possible to set the appropriate follow-up start permission time Tmo, even in a case of crawling at the low speed with the repetitive stops and starts in the short time, as a feature of the traffic jam on the highway. As a result, it is possible to increase the number of opportunities of follow-up automatic starts, leading to a higher level of user-friendliness.

Let us give a thought for a case, as a comparative example, that includes determining a start of a traffic jam in a case where turning-ON of hazard lights is detected, and extending pre-set normal follow-up start permission time by set time. This comparative example may involve the following disadvantages. First, this comparative example may lack accuracy because the traffic jam is determined only on the basis of the turning-ON of the hazard lights. Moreover, on a general road, a pedestrian, a bicycle, or other moving bodies may come around near the own vehicle. With the follow-up start permission time being evenly extended upon the determination of the traffic jam, the driver must be extremely careful at the time of an automatic start. This only results in an even bigger load on the driver.

Moreover, in this implementation, the category of the jammed road may be estimated solely on the basis of positional relation between the own vehicle M1 and the preceding vehicle N1 and on the basis of the parameters indicating the behavior of the own vehicle M1. This makes it possible to constitute an optimal traffic jam assistance (TJA) system even in a vehicle devoid of a car navigation system or an on-vehicle camera. Hence, it is possible to obtain the higher level of versatility.

The general road and the expressway such as the highway may be determined on the basis of, for example, map information of the car navigation system or image data of surrounding environment captured by the on-vehicle camera. However, this is not the case in the vehicle devoid of the on-vehicle camera or the car navigation system. Furthermore, in a case where the map information of the car navigation system is not updated, and lacks registration of a road on which the own vehicle travels, it is difficult to determine accurately the category of the relevant road on the basis of the map information.

[Second Implementation]

Figure 10:
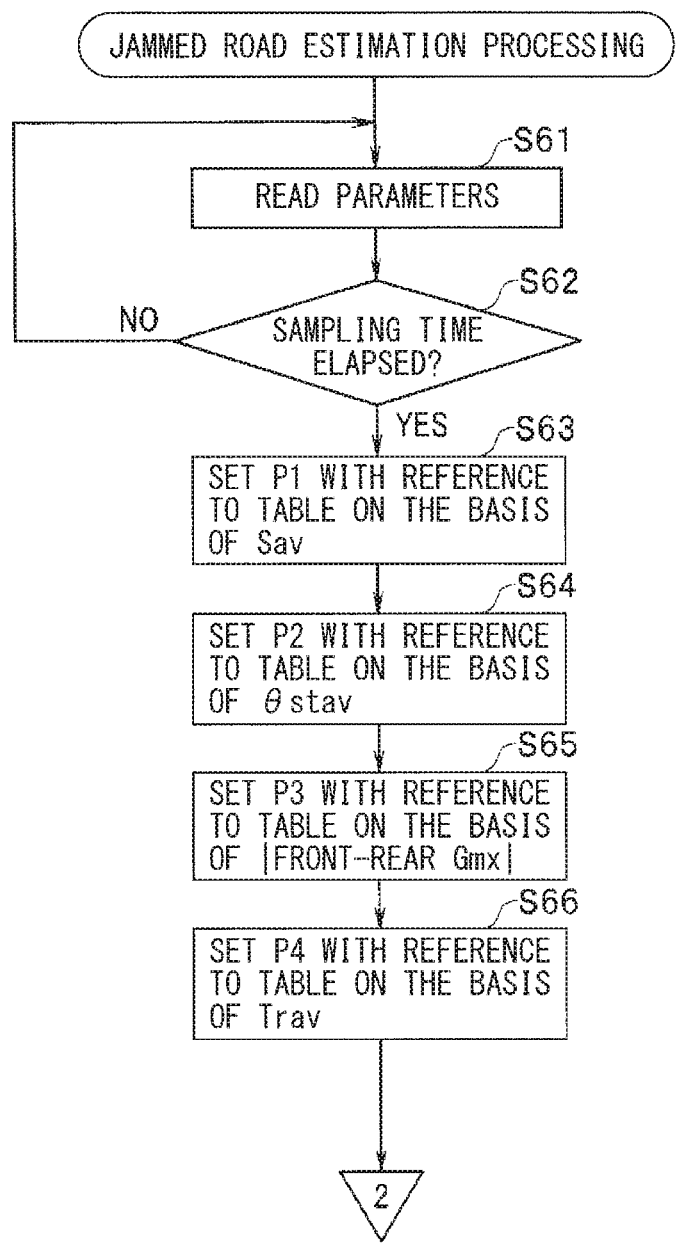
FIG. 10 is a flowchart (part 1) of a sub-routine of jammed road estimation processing according to a second implementation of the technology.
Figure 11:
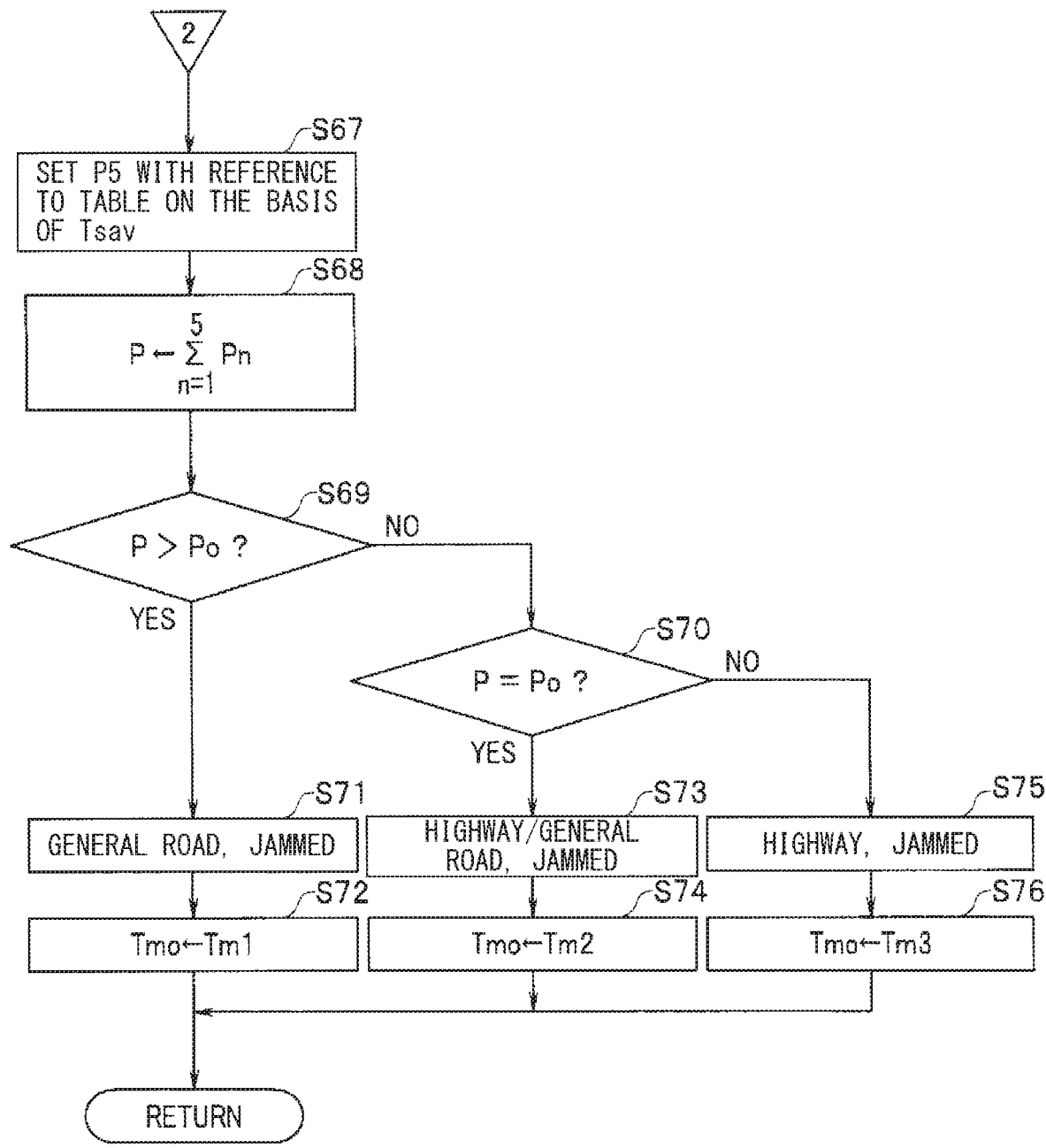
FIG. 11 is a flowchart (part 2) of the sub-routine of the jammed road estimation processing.

FIGS. 10 to 12 illustrate a second implementation of the technology. Flowcharts as illustrated in FIGS. 10 and 11 are a substitute for the sub-routine of the traffic jam estimation processing as described with reference to FIGS. 3 and 4.

In the forgoing first implementation, the category of the jammed road may be estimated as follows. The road recognition evaluation values P may be represented as 1 or 0 on the basis of the parameters indicating the behavior of the own vehicle M1 and on the basis of the relation to the preceding vehicle N1. The estimation as to whether the road category is the general road or whether the road category is the highway may be made on the basis of a total of the road recognition evaluation values P. This implementation may provide more detailed setting of the road recognition evaluation values. The road category may be estimated on a total of the road recognition evaluation values.

First, in steps S61 and S62, as with steps S11 and S12 as described with reference to FIG. 3, the parameters may be sampled until the elapse of the pre-set sampling time. The parameters are those involved in the determination of the category of the currently-jammed road, i.e., the "general road" and the "highway".

After the elapse of the sampling time, the flow may proceed to step S63. In steps S63 to S68, first to fifth parameter recognition evaluation values P1 to P5 may be set, in order to determine whether the currently-traveled road is the general road or whether the currently-traveled road is the highway. The first to the fifth parameter recognition evaluation values P1 to P5 may correspond to an average value or a maximum value of the respective parameters sampled in the sampling time. Hereinafter, the first to the fifth parameter recognition evaluation values P1 to P5 are also simply referred to as "recognition evaluation values P1 to P5".

In one specific but non-limiting example, in step S63, the first recognition evaluation value P1 may be set, with reference to a first recognition evaluation table, on the basis of the average vehicle speed Sav [km/h]. The average vehicle speed Sav is an average value of the vehicle speed S of the own vehicle M1. FIG. 12A illustrates one example of the first recognition evaluation table. As summarized in the table, in this implementation, the average vehicle speed Sav may be classified by two thresholds on low-speed side, into three classes. In the table, the three classes may be as follows: Sav≤15, 15<Sav<30, and 30<Sav. The first recognition evaluation value P1 may be assigned to the three classes as follows: P1=2, 1, and 0.

In step S64, the second recognition evaluation value P2 may be set, with reference to a second recognition evaluation table, on the basis of the average steering angle θstav [deg]. The average steering angle θstav is an average value of the steering angle θst. FIG. 12B illustrates one example of the second recognition evaluation table. As summarized in the table, in this implementation, the average steering angle θstav may be classified by two thresholds into three classes. In the table, the three classes may be as follows: θstav≤30, 30<θstav≤60, and 60<θstav. The second recognition evaluation value P2 may be assigned to the three classes as follows: P2=2, 1, and 0.

In step S65, the third recognition evaluation value P3 may be set, with reference to a third recognition evaluation table, on the basis of the absolute value of the maximum value of the front-rear G |front-rear Gmx| [m/s$^2$]. FIG. 12C illustrates one example of the third recognition evaluation table. As summarized in the table, in this implementation, the absolute value front-rear Gmx may be classified by a predetermined G serving as a threshold. In the table, the predetermined G may be, for example, 0.2 G. In a case where the absolute value |front-rear Gmx| is equal to or smaller than the threshold (e.g., |front-rear Gmx|≤0.2), the third recognition evaluation value P3 of 1 may be assigned (P3=1). In a case where the absolute value |front-rear Gmx| is larger than the threshold (e.g., |front-rear Gmx|>0.2), the third recognition evaluation value P3 of 0 may be assigned (P3=0).

In step S66, the fourth recognition evaluation value P4 may be set, with reference to a fourth recognition evaluation table, on the basis of the average running time Trav [sec]. FIG. 12D illustrates one example of the fourth recognition evaluation table. As summarized in the table, in this implementation, the average running time Trav may be classified by two thresholds into three classes. In the table, the three classes may be as follows: Trav≤90, 90<Trav≤120, and 120<Trav. The fourth recognition evaluation value P4 may be assigned to the three classes as follows: P4=2, 1, and 0.

In step S67, the fifth recognition evaluation value P5 may be set, with reference to a fifth recognition evaluation table, on the basis of the average stop time Tsav [sec]. FIG. 12E illustrates one example of the fifth recognition evaluation table. As summarized in the table, in this implementation, the average stop time Tsav may be classified by two thresholds into three classes. In the table, the three classes may be as follows: Tsav≤30, 30<Tsav≤60, and 60<Tsav. The fifth recognition evaluation value P5 may be assigned to the three classes as follows: P5=2, 1, and 0. It is to be noted that the values of the thresholds, the number of the thresholds for the classification, and the evaluation values to be assigned are not limited to as exemplified above, but may be set at any values.

Thereafter, in step S68, the recognition evaluation values P1 to P5 as mentioned above may be added, to calculate the road recognition evaluation value P (P←Σ (P1 to P5)) as a final scoring evaluation. In steps S69 and S70, as with steps S28 and S29 as described with reference to FIG. 4, the comparison of the road recognition evaluation value P with the road category determination threshold Po may be made, to determine whether the currently-traveled road is the general road or whether the currently-traveled road is the highway. It is to be noted that the road category determination threshold Po may be obtained on the basis of the parameters indicating the behavior of the own vehicle M1 as traveling on the jammed road, by, for example, simulation.

First, in a case of P>Po, the flow may proceed to step S71. In step S71, a determination may be made that the jammed road is the general road. In step S72, the follow-up start permission time Tmo may be set at the first permission time Tm1 (Tmo←Tm1), and the routine may be terminated.

In a case of P=Po, the flow may proceed to step S73. In step S73, a determination may be made that the jammed road is in the intermediate region that is undeterminable as to whether the road is the general road or whether the road is the highway. In step S74, the follow-up start permission time Tmo may be set at the second permission time Tm2 (Tmo←Tm2), and the routine may be terminated.

In a case of P≤Po, the flow may proceed to step S75. In step S75, a determination may be made that the jammed road is the highway. In step S76, the follow-up start permission time Tmo may be set at the third permission time Tm3 (Tmo←Tm3), and the routine may be terminated.

In one implementation of the technology, the ACC_ECU 11 that performs steps S61 to S71, S73, and S75 may serve as the "estimation unit". In one implementation of the technology, the ACC_ECU 11 that performs steps S72, S74, and S76 may serve as the "setting unit".

As described, in this implementation, in estimating the category of the jammed road, setting of recognition evaluation may be provided, for each of the plurality of the parameters Sav, θstav, |front-rear Gmx|, Trav, and Tsav, in accordance with their levels. The plurality of the parameters indicate the behavior of the own vehicle M1 in the traffic jam. The first to the fifth recognition evaluation values P1 to P5 set for the respective parameters may be added, to obtain the road recognition evaluation value P. On the basis of the road recognition evaluation value P, estimated may be the road category. This leads to reduction in probability of erroneous determination, in addition to the effects of the forgoing first implementation. Hence, it is possible to estimate the category of the jammed road with higher probability.

Although description has been made by giving the implementations as mentioned above, the contents of the technology are not limited to the above-mentioned implementations and may be modified in a variety of ways. For example, the number of times the main brake 25a operates in predetermined time may be additionally provided as the parameter indicating the behavior of the own vehicle M1. Furthermore, part of the parameters as described in the forgoing implementations may be omitted. For example, a determination based on the steering angle may be omitted. Moreover, in the forgoing implementations, the first automatic start permission time Tm1 may be 3 [sec] (Tm1=3 [sec]). However, the first automatic start permission time Tm1 may be set as follow-up stop determination time, instead of the automatic start permission time of the ACC. The follow-up stop determination time may be time at which the system determines the follow-up stop of the vehicle.

In one implementation described above, the ACC_ECU 11 illustrated in FIG. 1 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the ACC_ECU 11. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 1.

Although some preferred implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A follow-up start control device for a vehicle, comprising:
   a recognition unit configured to detect a stop and a start of a preceding vehicle that travels immediately in front of an own vehicle;
   a first determination unit configured to determine presence or absence of a traffic jam on a road on which the own vehicle is currently traveling, on a basis of the stop and the start of the preceding vehicle and on a basis of parameters that indicate behavior of the own vehicle;
   an estimation unit configured to estimate a category of the road, on the basis of the parameters, on a condition that the first determination unit determines the presence of the traffic jam on the road;
   a setting unit configured to set a permission time, in accordance with the category of the road estimated by the estimation unit;
   a second determination unit configured to compare a stop time with the permission time, the stop time being time from a follow-up stop of the own vehicle after the preceding vehicle to detection of the start of the preceding vehicle; and
   a controller configured to execute a follow-up automatic start control on a condition that the second determination unit determines that the stop time is equal to or shorter than the permission time, the follow-up automatic start control including allowing the own vehicle to make a follow-up start after the preceding vehicle.

2. The follow-up start control device for the vehicle according to claim 1, wherein
   the estimation unit is configured to
      make separate comparisons of a plurality of kinds of the parameters detected, with determination values, to set a plurality of first evaluation values, and
      make a comparison of an addition value of the plurality of the first evaluation values with a first determination threshold, to estimate the category of the road.

3. The follow-up start control device for the vehicle according to claim 2, wherein
   the estimation unit is configured to
      set a plurality of second evaluation values per each of the parameters, on a basis of results of the separate comparisons of the parameters with a plurality of kinds of the determination values, and
      make a comparison of an addition value of the plurality of the second evaluation values with a second determination threshold, to estimate the category of the road.

4. The follow-up start control device for the vehicle according to claim 1, wherein
   the road is categorized in any one of categories including, at least, a general road and an expressway, and
   the estimation unit is configured to estimate, on the basis of the parameters, which to categorize the road in, the general road or the expressway.

5. The follow-up start control device for the vehicle according to claim 2, wherein
   the road is categorized in any one of categories including, at least, a general road and an expressway, and
   the estimation unit is configured to estimate, on the basis of the parameters, which to categorize the road in, the general road or the expressway.

6. The follow-up start control device for the vehicle according to claim 3, wherein
   the road is categorized in any one of categories including, at least, a general road and an expressway, and
   the estimation unit is configured to estimate, on the basis of the parameters, which to categorize the road in, the general road or the expressway.

7. The follow-up start control device for the vehicle according to claim 1, wherein
   the parameters include, at least, any one of a vehicle speed of the own vehicle, a steering angle of the own vehicle, front-rear acceleration of the own vehicle, the stop time, and running time from an end of a stopped state to a start of a next stopped state of the own vehicle.

8. The follow-up start control device for the vehicle according to claim 2, wherein
   the parameters include, at least, any one of a vehicle speed of the own vehicle, a steering angle of the own vehicle, front-rear acceleration of the own vehicle, the stop time, and running time from an end of a stopped state to a start of a next stopped state of the own vehicle.

9. The follow-up start control device for the vehicle according to claim 3, wherein
   the parameters include, at least, any one of a vehicle speed of the own vehicle, a steering angle of the own vehicle, front-rear acceleration of the own vehicle, the stop time, and running time from an end of a stopped state to a start of a next stopped state of the own vehicle.

10. The follow-up start control device for the vehicle according to claim 4, wherein
    the parameters include, at least, any one of a vehicle speed of the own vehicle, a steering angle of the own vehicle, front-rear acceleration of the own vehicle, the stop time, and running time from an end of a stopped state to a start of a next stopped state of the own vehicle.

11. The follow-up start control device for the vehicle according to claim 5, wherein
    the parameters include, at least, any one of a vehicle speed of the own vehicle, a steering angle of the own vehicle, front-rear acceleration of the own vehicle, the stop time, and running time from an end of a stopped state to a start of a next stopped state of the own vehicle.

12. The follow-up start control device for the vehicle according to claim 6, wherein
    the parameters include, at least, any one of a vehicle speed of the own vehicle, a steering angle of the own vehicle, front-rear acceleration of the own vehicle, the stop time, and running time from an end of a stopped state to a start of a next stopped state of the own vehicle.

13. A follow-up start control device for a vehicle, the follow-up start control device comprising:
    circuitry that:
       detects a stop and a start of a preceding vehicle that travels immediately in front of an own vehicle;
       determines presence or absence of a traffic jam on a road on which the own vehicle is currently traveling based on the stop and the start of the preceding vehicle and based on parameters that indicate behavior of the own vehicle;
       estimates a category of the road based on the parameters, on a condition that the presence of the traffic jam on the road is determined;
       sets a permission time in accordance with the category of the estimated road;
       compares a stop time with the permission time, the stop time being time from a follow-up stop of the own vehicle after the preceding vehicle to detection of the start of the preceding vehicle; and executes a follow-up automatic start control on a condition that the stop time is determined to be equal to or shorter than the permission time, the follow-up automatic start control including allowing the own vehicle to make a follow-up start after the preceding vehicle.

14. A follow-up start control method for a vehicle, the follow-up start control method comprising:

detecting a stop and a start of a preceding vehicle that travels immediately in front of an own vehicle;

determining presence or absence of a traffic jam on a road on which the own vehicle is currently traveling based on the stop and the start of the preceding vehicle and based on parameters that indicate behavior of the own vehicle;

estimating a category of the road based on the parameters, on a condition that the presence of the traffic jam on the road is determined;

setting a permission time in accordance with the category of the estimated road;

comparing a stop time with the permission time, the stop time being time from a follow-up stop of the own vehicle after the preceding vehicle to detection of the start of the preceding vehicle; and executing a follow-up automatic start control on a condition that the stop time is determined to be equal to or shorter than the permission time, the follow-up automatic start control including allowing the own vehicle to make a follow-up start after the preceding vehicle.

* * * * *